United States Patent
Tinkham et al.

(10) Patent No.: US 11,748,842 B2
(45) Date of Patent: Sep. 5, 2023

(54) METHODS AND APPARATUS FOR CONTENT SHIFTING IN FOVEATED RENDERING

(71) Applicant: QUALCOMM Incorporated, San Diego, CA (US)

(72) Inventors: Jonathan Scott Tinkham, Arvada, CO (US); Jonathan Wicks, Louisville, CO (US); Samuel Benjamin Holmes, Sterling, MA (US); Robert Vanreenen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/229,242

(22) Filed: Apr. 13, 2021

(65) Prior Publication Data

US 2022/0327658 A1  Oct. 13, 2022

(51) Int. Cl.
*G06T 3/20* (2006.01)
*G06T 7/37* (2017.01)
*G06T 1/20* (2006.01)
*G06T 1/60* (2006.01)
*G06F 3/01* (2006.01)

(52) U.S. Cl.
CPC .............. *G06T 3/20* (2013.01); *G06T 1/20* (2013.01); *G06T 1/60* (2013.01); *G06T 7/37* (2017.01); *G06F 3/013* (2013.01)

(58) Field of Classification Search
CPC .... G06T 3/20; G06T 1/20; G06T 1/60; G06T 7/37; G06F 3/013
USPC ........................................................ 345/618
See application file for complete search history.

(56) References Cited

U.S. PATENT DOCUMENTS

| 10,331,207 | B1* | 6/2019 | Simmons ............. H04N 13/344 |
| 2013/0051694 | A1* | 2/2013 | Ayzenberg ............. H04N 19/18 |
| | | | 382/250 |
| 2018/0350036 | A1* | 12/2018 | VanReenen .......... H04N 1/3935 |
| 2019/0028645 | A1 | 1/2019 | Satoh |
| 2019/0066365 | A1 | 2/2019 | Schmalstieg et al. |
| 2019/0246138 | A1* | 8/2019 | Terterov ................. H04N 19/14 |

(Continued)

OTHER PUBLICATIONS

International Search Report and Written Opinion—PCT/US2022/020458—ISA/EPO—dated Aug. 8, 2022.

(Continued)

*Primary Examiner* — James A Thompson
*Assistant Examiner* — Kim Thanh T Tran
(74) *Attorney, Agent, or Firm* — Procopio, Cory, Hargreaves & Savitch LLP

(57) ABSTRACT

The present disclosure relates to methods and devices for graphics processing including an apparatus, e.g., a GPU. The apparatus may process at least one frame including frame content associated with a grid including a plurality of grid sections, each of a plurality of portions of the frame content being aligned with at least a portion of at least one of the plurality of grid sections. The apparatus may also shift the frame content with respect to the grid, such that at least one portion of the plurality of portions of the frame content is aligned with at least a portion of at least one distinct grid section of the plurality of grid sections. Additionally, the apparatus may store the shifted frame content including the at least one portion of the frame content that is aligned with at least a portion of the at least one distinct grid section.

23 Claims, 9 Drawing Sheets

(56) References Cited

U.S. PATENT DOCUMENTS

| | | |
|---|---|---|
| 2019/0347763 A1 | 11/2019 | Goel et al. |
| 2020/0051213 A1 | 2/2020 | Nallam |
| 2021/0027752 A1 | 1/2021 | Holmes et al. |
| 2021/0049981 A1* | 2/2021 | Seiler .................. H04N 13/106 |
| 2021/0134199 A1* | 5/2021 | Lee ......................... G09G 3/20 |
| 2022/0182563 A1* | 6/2022 | Mun ................ H01L 27/14603 |

OTHER PUBLICATIONS

Partial International Search Report—PCT/US2022/020458—ISA/EPO—dated Jun. 17, 2022.

* cited by examiner

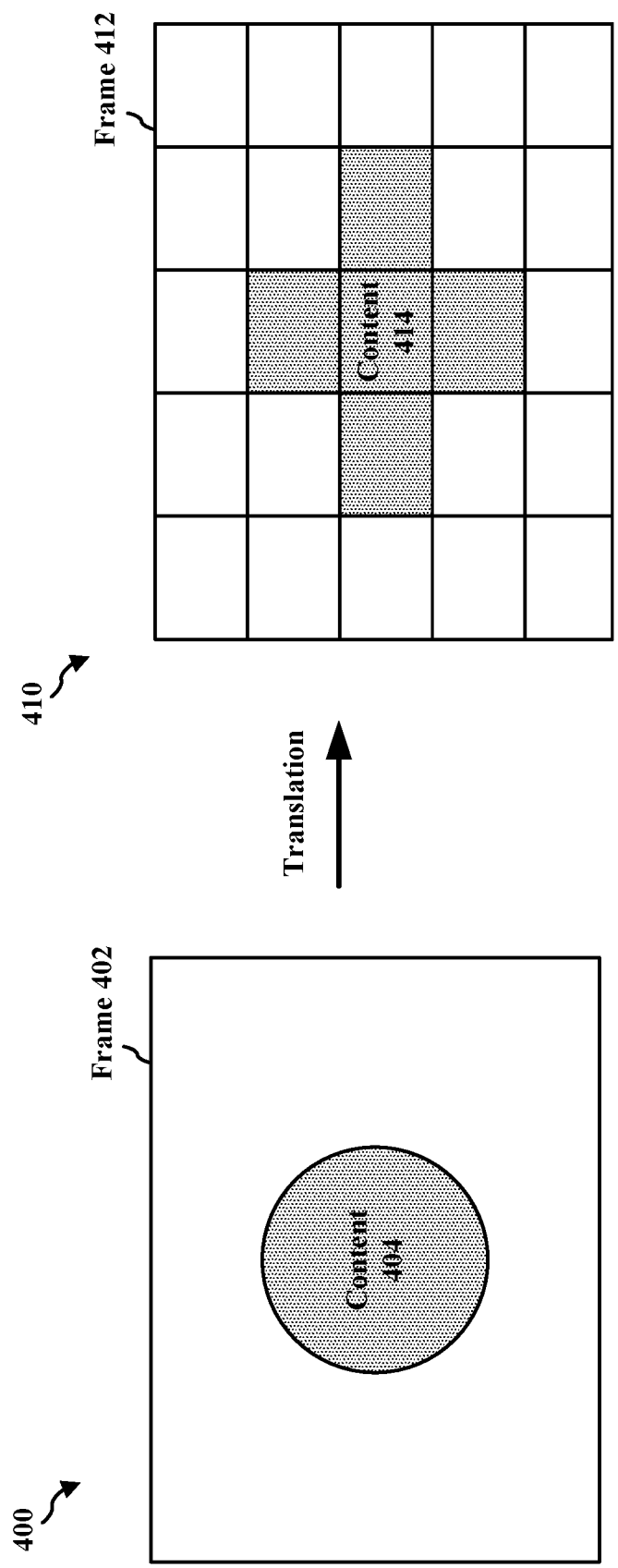

METHODS AND APPARATUS FOR CONTENT SHIFTING IN FOVEATED RENDERING

TECHNICAL FIELD

The present disclosure relates generally to processing systems and, more particularly, to one or more techniques for graphics processing.

INTRODUCTION

Computing devices often perform graphics and/or display processing (e.g., utilising a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform graphics processing. The apparatus may receive at least one frame including frame content, where the at least one frame is processed after being received. The apparatus may also process at least one frame including frame content associated with a grid including a plurality of grid sections, each of a plurality of portions of the frame content being aligned with at least a portion of at least one of the plurality of grid sections. Additionally, the apparatus may shift the frame content with respect to the grid, such that at least one portion of the plurality of portions of the frame content is aligned with at least a portion of at least one distinct grid section of the plurality of grid sections. The apparatus may also store, upon shifting the frame content with respect to the grid, the shifted frame content including the at least one portion of the frame content that is aligned with at least a portion of the at least one distinct grid section. The apparatus may also retrieve, upon storing the shifted frame content, the shifted frame content. Moreover, the apparatus may re-shift, upon retrieving the shifted frame content, the retrieved frame content, such that the re-shifted frame content corresponds to the processed frame content. The apparatus may also render, upon re-shifting the frame content, the re-shifted frame content. The apparatus may also transmit, upon re-shifting the frame content, one or more frames including the re-shifted frame content.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating example content in a frame in accordance with one or more techniques of this disclosure.

FIG. 4B is a diagram illustrating example content in a frame in accordance with one or more techniques of this disclosure.

DETAILED DESCRIPTION

Figure 1:
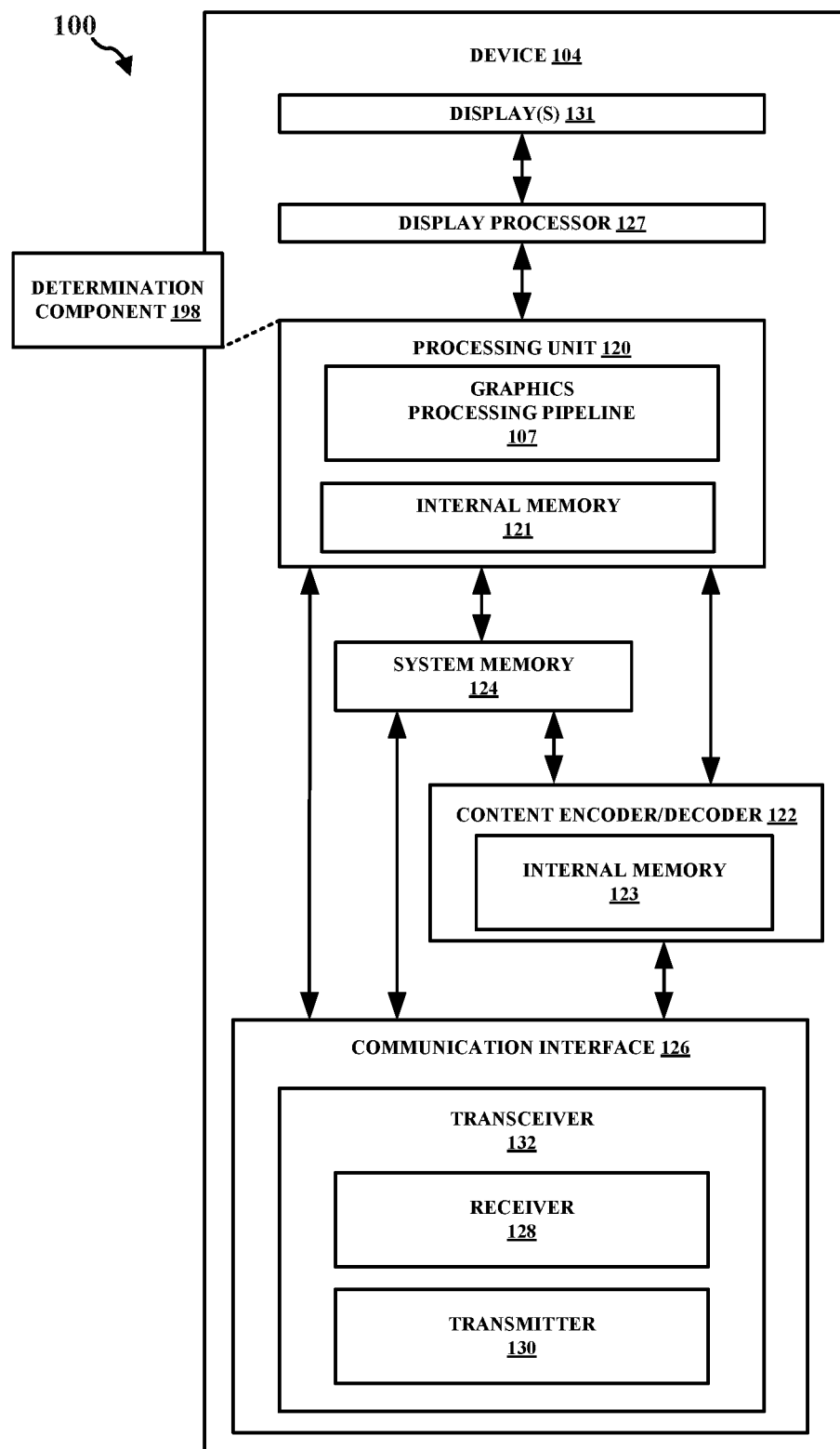
FIG. 1 is a block diagram that illustrates an example content generation system in accordance with one or more techniques of this disclosure.

In some aspects of graphics processing, virtual reality (VR), augmented reality (AR), or extended reality (XR) applications may utilize different rendering techniques in order to reduce the rendering workload. For instance, VR/AR/XR applications may utilise foveated rendering, which is a rendering technique that uses an eye tracker integrated with a headset. The technique of foveated rendering may help to reduce the rendering workload by scaling content outside of a certain area, e.g., a focus area of the user's vision. In some aspects, when the foveation is tied to a grid, it may become difficult to consistently move the focal area of the user. Moreover, this may cause translations to have conspicuous changes in quality, i.e., quality changes that are eye-catching or "popping." Additionally, the eye-tracking utilized by foveated rendering, i.e., moving the focal point along with the user's eye focus, may be difficult to be performed smoothly. In some aspects, certain content may need to be rendered multiple times, which contrasts with a desire for fast rendering in VR/AR/XR applications. Accordingly, it may be beneficial to reduce the rendering time in VR/AR/XR applications associated with foveated rendering. In some instances, adjusting a grid, e.g., a tile grid, during a foveated rendering process may have a high likelihood of negatively impacting performance. For instance, adjusting the shape or area of regions with differing quality during foveated rendering may result in an unpredictable rendering performance. Aspects of the present disclosure may allow for a consistent visual quality when utilising foveated rendering. Further, aspects of the present disclosure may smoothly and consistently perform certain functions, e.g., eye-tracking, that are utilized with foveated rendering. Aspects of the present disclosure may also adjust an area or grid associated with foveated rendering without negatively impacting performance observed by a user. For example, aspects of the present disclosure may adjust the shape or area of regions with differing quality during foveated rendering while maintaining a consistent rendering performance. Also, aspects of the present disclosure may reduce the rendering time for foveated rendering in VR/AR/XR applications.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to receive at least one frame including frame content, where the at least one frame is processed after being received. The determination component 198 may also be configured to process at least one frame including frame content associated with a grid including a plurality of grid sections, each of a plurality of portions of the frame content being aligned with at least a portion of at least one of the plurality of grid sections. The determination component 198 may also be configured to shift the frame content with respect to the grid, such that at least one portion of the plurality of portions of the frame content is aligned with at least a portion of at least one distinct grid section of the plurality of grid sections. The determination component 198 may also be configured to store, upon shifting the frame content with respect to the grid, the shifted frame content including the at least one portion of the frame content that is aligned with at least a portion of the at least one distinct grid section. The determination component 198 may also be configured to retrieve, upon storing the shifted frame content, the shifted frame content. The determination component 198 may also be configured to re-shift, upon retrieving the frame content, the retrieved frame content, such that the re-shifted frame content corresponds to the processed frame content. The determination component 198 may also be configured to render, upon re-shifting the frame content, the re-shifted frame content. The determination component 198 may also be configured to transmit, upon re-shifting the frame content, one or more frames including the re-shifted frame content. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
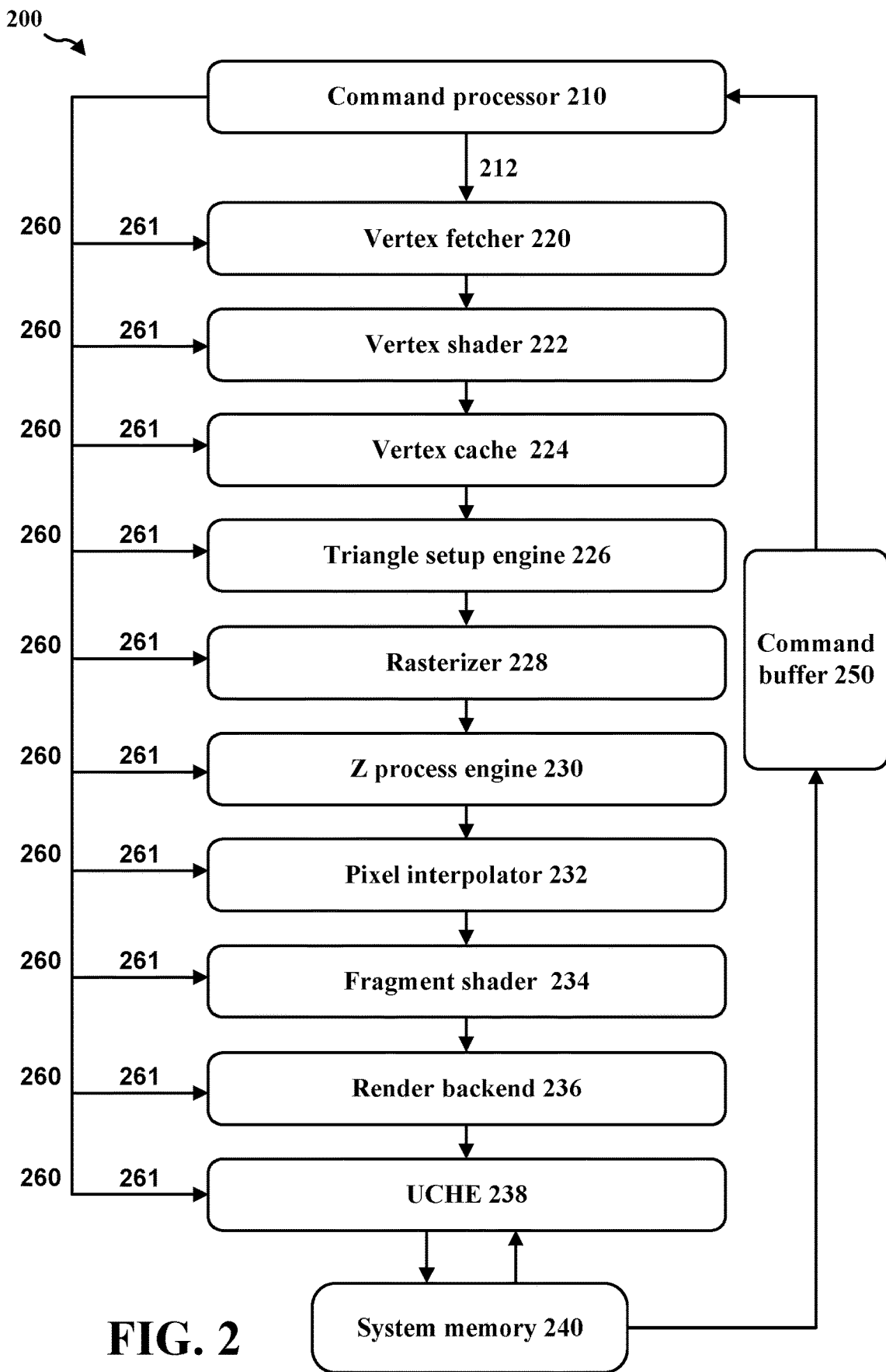
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
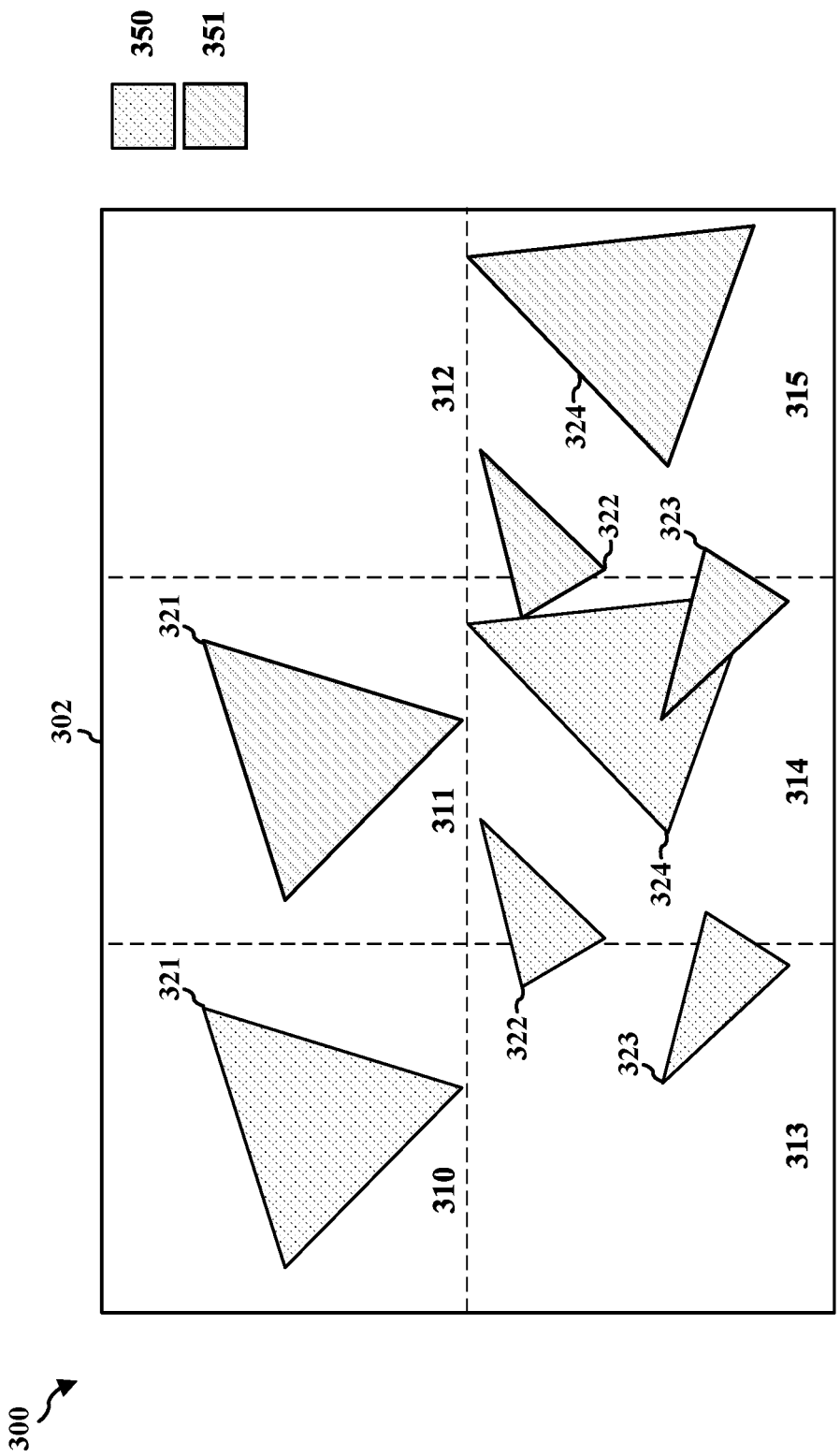
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles Aspects of graphics processing are associated with a number of different types of content, e.g., virtual reality (VR) content, augmented reality (AR) content, and/or extended reality (XR) content. In VR content, the content displayed at the user or client device may correspond to augmented content, e.g., content rendered at a host device, server, or the client device. In AR or XR content, a portion of the content displayed at the client device may correspond to real-world content, e.g., objects in the real world, and a portion of the content can be augmented content. Also, the augmented content and real-world content may be displayed in an optical see-through or a video see-through device, such that the user can view real-world objects and augmented content simultaneously.

In some aspects, in VR/AR/XR mode, a client or user may utilize a head mounted device (HMD) or headset in order to view VR/AR/XR content. For example, an HMD or headset may utilize two external cameras pointing outward to capture real-world objects. The left and right camera images may also be displayed in an internal LCD or OLED display. Additionally, a pair of display lenses may be mounted in front of the display. The user may then view the external world via the display lens, the display, and/or the external camera. As mentioned herein, VR/AR/XR content can be generated or viewed using a host device or server and a client or user device. In some aspects, a host device may be a mobile device, a smart phone, a personal computer, a laptop, and/or any other appropriate device. Additionally, a client device may be a head mounted device (HMD), a headset, and/or any other appropriate device. In one configuration, VR/AR/XR content may be a split configuration, e.g., a HMD tethered to a mobile device. In these configurations, the VR/AR/XR computations may be handled by the mobile device and the HMD may provide sensor data to the mobile device and the display to the user.

In some aspects of graphics processing, VR/AR/XR applications may utilize different rendering techniques in order to reduce the rendering workload. For instance, VR/AR/XR applications may utilize foveated rendering, which is a rendering technique that may utilize an HMD or headset. The technique of foveated rendering may help to reduce the rendering workload by scaling content outside of a certain area, e.g., a focus area of the user's vision. That is, foveated rendering may reduce the rendering workload by reducing the image quality in the user's peripheral vision, i.e., outside of the zone viewed by the user's fovea (a small depression in the retina of the eye where visual acuity is highest). The approach of foveated rendering is meant to mimic the sensitivity of the human eye while taking advantage of lens quality used in VR/AR/XR headsets. In some aspects, foveated rendering or fixed foveated rendering may be supplemented with eye-tracking.

FIGS. 4A and 4B are diagrams 400 and 410, respectively, of content within a frame 402 and frame 412. More specifically, FIGS. 4A and 4B display that certain types of rendering, e.g., tile-based rendering, may include foveated rendering associated with a grid, e.g., a tile grid. In tile-based rendering with foveation, the tile granularity may be maintained when interpreted by the foveated rendering. As shown in FIGS. 4A and 4B, the content 404 (the circle in FIG. 4A) from foveated rendering may be translated to the content 414 (the tile formation in the tile grid in FIG. 4B). As such, the content focal points in FIG. 4A may be translated to certain tiles in the tile grid in FIG. 4B. In FIGS. 4A and 4B, the dotted portion of the frame content (e.g., content 404 and 414) corresponds to a higher quality or resolution, i.e., it corresponds to the focal area of a user.

In some aspects, when the foveation is tied to a grid, it may become difficult to consistently move the focal area of the user. For instance, moving a focal-point of a user may snap the foveation to a grid. Moreover, this may cause translations to have conspicuous changes in quality, i.e., quality changes that are eye-catching or "popping." These types of translations used in foveated rendering may also be difficult to accurately position over specific features. For example, certain types of user interface (UI) elements, e.g., text-based UI elements, may need a higher quality of rendering in the peripheral area than is typically provided in foveated rendering. Additionally, the eye-tracking utilized by foveated rendering, i.e., moving the focal point along with the user's eye focus, may be difficult to be performed smoothly. In some aspects, certain content may need to be rendered multiple times, which contrasts with a desire for fast rendering in VR/AR/XR applications. Accordingly, it may be beneficial to reduce the rendering time in VR/AR/XR applications associated with foveated rendering.

In some instances, adjusting a grid, e.g., a tile grid, during a foveated rendering process may have a high likelihood of negatively impacting performance. For instance, adjusting the shape or area of regions with differing quality during foveated rendering may result in an unpredictable rendering performance. Based on the above, it may be beneficial to provide a consistent visual quality when utilising foveated rendering. It may also be beneficial to smoothly perform eye-tracking utilized with foveated rendering. Moreover, it may be beneficial to adjust an area associated with foveated rendering without negatively impacting performance. For instance, it may be beneficial to adjust the shape or area of regions with differing quality during foveated rendering while maintaining a consistent rendering performance.

Aspects of the present disclosure may provide a consistent visual quality when utilizing foveated rendering. Further, aspects of the present disclosure may smoothly and consistently perform certain functions, e.g., eye-tracking, that are utilized with foveated rendering. Aspects of the present disclosure may also adjust an area or grid associated with foveated rendering without negatively impacting the performance observed by a user. For example, aspects of the present disclosure may adjust the shape or area of regions with differing quality during foveated rendering while maintaining a consistent rendering performance. Also, aspects of the present disclosure may reduce the rendering time for foveated rendering in VR/AR/XR applications.

In order to maintain a consistent rendering performance when adjusting the shape/area of regions with differing quality, aspects of the present disclosure may offset or adjust a grid or tile area, i.e., utilize grid offsetting or tile offsetting. In grid offsetting or tile offsetting, aspects of the present disclosure may shift the content over a grid or tile grid by a desired offset. For example, the grid or tile grid may be any suitable size including a conceptually infinite size. In some instances, when offsetting or adjusting a grid or tile area, aspects of the present disclosure may not shift the input focal-point itself. By maintaining the input focal-point, this may leave the interpretation of the foveation parameters unchanged. Also, this may allow aspects of the present disclosure to utilize pixel-granular viewport shifts of the content.

In some aspects, offsetting or adjusting a grid or tile area may be functionally equivalent to a grid offset, e.g., a tile offset of the tile grid, from the perspective of the frame content. For instance, aspects of the present disclosure may shift the frame content with respect to the grid. Aspects of the present disclosure may also store the frame content after it has been shifted. After shifting and storing the frame content with respect to the grid, aspects of the present disclosure may undo the content shifting by moving the frame content back to the surface origin. In some instances, for certain types of images, e.g., sparse images, texture sampling offsets may be utilized to restore the original frame content.

Aspects of the present disclosure may smoothly shift the frame content with respect to the grid or tile grid. So the present disclosure may utilize tile-based rendering techniques, but shift the frame content in comparison to the tile grid. Accordingly, the high quality focal region of the foveated rendering may remain the same while it is shifted or adjusted with respect to the tile grid. For example, the content or high quality focal region may remain the same shape, but be shifted by an offset amount over the tile grid. Also, when the shifted content is stored to system memory, the content position may be restored and the translation may be undone. As such, from the perspective of the image or frame, the tile grid may be shifted. Thus, by shifting the image content, the tile grid may appear to move (although the grid does not actually move), so the effect may be that the tile grid is shifted. Additionally, the aforementioned shifting or adjusting of frame content or image content may apply to other operations outside of tile rendering. For instance, the aforementioned shifting of frame content, as well as the granularity of the shifting, may be applied to different types of rendering operations or shifting operations, e.g., operations with restrictions on granularity.

Figures 5A, 5B:
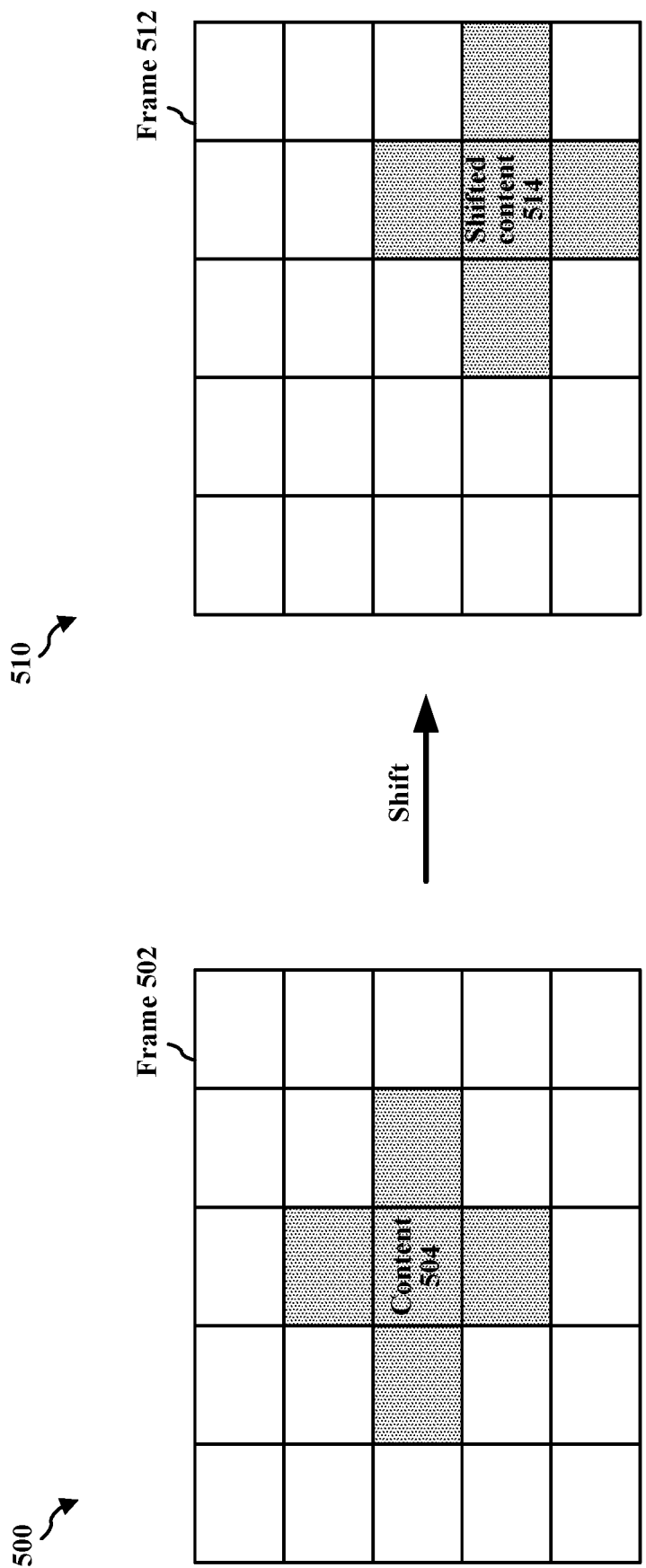
FIG. 5A is a diagram illustrating example content in a frame in accordance with one or more techniques of this disclosure.
FIG. 5B is a diagram illustrating example content in a frame in accordance with one or more techniques of this disclosure.

FIGS. 5A and 5B are diagrams 500 and 510, respectively, of content within a frame 502 and frame 512. FIGS. 5A and 5B display that certain types of rendering, e.g., tile-based rendering, utilize foveated rendering with a grid, e.g., a tile grid. FIG. 5A depicts an original location of frame content 504 with respect to a tile grid. FIG. 5B shows a shifted location of frame content 514 with respect to the tile grid, i.e., after the frame content has been shifted with respect to the grid. Accordingly, FIGS. 5A and 5B illustrate an example of the aforementioned shifting of frame content over a tile grid by an offset.

Aspects of the present disclosure may also reduce the amount of memory usage when shifting or adjusting frame content with respect to a tile grid. Certain types of images, e.g., sparse images, and storage methods may have alignment restrictions that prevent returning content to the original location. Other approaches may necessitate the over-allocation of system memory. In contrast, aspects of the present disclosure may shift and re-shift content while maintaining or reducing the amount of memory usage. In some instances, as behavior may be based on a tile granularity, aspects of the present disclosure may bound or wrap certain offsets based on tile sizes, i.e., at the edge of tiles. So aspects of the present disclosure may bound the shifting offset or set a limit on the area in which the content can be shifted. Aspects of the present disclosure may also shift or adjust the scale factors by a certain amount, e.g., a percentage of a tile size or a full tile size. Further, aspects of the present disclosure may shift a viewpoint of a user by a certain amount, e.g., a percentage of a tile size or the size of a full tile. This approach may utilize a small amount of extra memory for storage, e.g., the amount of a tile size of extra memory for storage.

Figure 6B:
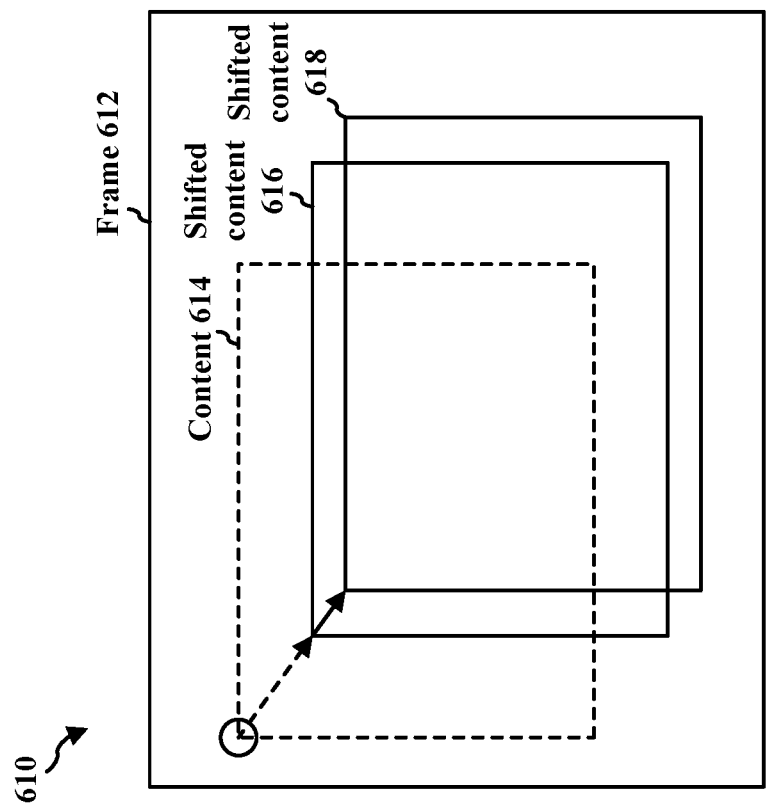
FIG. 6B is a diagram illustrating example content in a frame in accordance with one or more techniques of this disclosure.
Figure 6A:
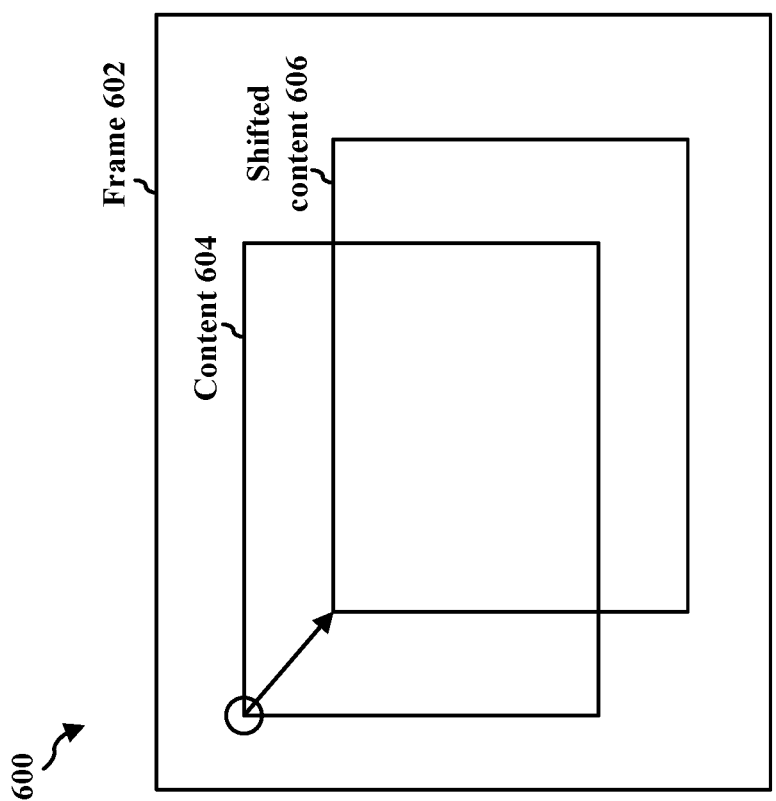
FIG. 6A is a diagram illustrating example content in a frame in accordance with one or more techniques of this disclosure.

FIGS. 6A and 6B are diagrams 600 and 610, respectively, of shifting content within a frame 602 and frame 612. FIG. 6A displays a desired offset from an origin point in content 604 (e.g., the circle in FIG. 6A) to shifted content 606. FIG. 6B depicts using an unaligned shift to achieve the desired offset of content 614 including shifted content 616 and shifted content 618. More specifically, FIG. 6B shows the desired offset (the arrow in FIG. 6A) is achieved by using a small unaligned shift (the solid arrow in FIG. 6B), but changing the tile-aligned origin of the desired behavior (e.g., the circle in FIG. 6B) to achieve an effective shift, i.e., a shift of the solid arrow in FIG. 6B plus the dashed arrow in FIG. 6B. FIGS. 6A and 6B illustrate that aspects of the present disclosure may wrap or bound the shifting offset area in which the content can be shifted.

In order to accomplish the aforementioned shifting of frame content with respect to a tile grid, aspects of the present disclosure may perform a number of different steps or processes. For instance, aspects of the present disclosure may increase a system memory allocation by a certain amount. Aspects of the present disclosure may also increase the dimensions of the grid or tile grid, i.e., enlarge the grid width and/or height. Further, aspects of the present disclosure may offset foveation scale-factor reads in order to accommodate the content shift by a certain amount. Aspects of the present disclosure may also perform the content shifting based on a tile offset amount or a percentage of tile size. Moreover, aspects of the present disclosure may store the content after it is shifted by the offset amount.

In one example, aspects of the present disclosure may shift content by an amount of pixels, e.g., 200 pixels, when utilising a tile grid with tiles of a certain size, e.g., tiles including a width of 96 pixels. In doing so, aspects of the present disclosure may perform the following steps (1)-(5): (1) Enlarge a system memory allocation by 96 pixels in each direction. (2) Enlarge a tile-grid width and height by 1 tile in each direction. (3) Offset foveation scale-factor reads to accommodate the shift amount. In order to do so, foveation scale-factor reads may be offset by 2 tiles e.g., floored to tile-size (200/96)*96=192 pixels. Also, if the offset is outside of the tile grid, i.e., out-of-bounds, the offset may be bounded or clamped to the edge value of the tile grid. (4) Shift the viewport by a certain amount of pixels, e.g., take (tilesize−(offset % tilesize) % tilesize). With a 192-pixel shift from moving scale-factors over two tiles, this may result in an effective 200-pixel offset. Accordingly, a 200-pixel shift may correspond to an 8-pixel viewport shift. After this, the content may be rendered. (5) Store the content after it is shifted by the offset amount, i.e., on-store the shifted offset. In doing so, aspects of the present disclosure may shift an offset by a certain amount to move the content on-store. This may avoid allocating a full bin-size worth of system memory surface.

Figure 7A:
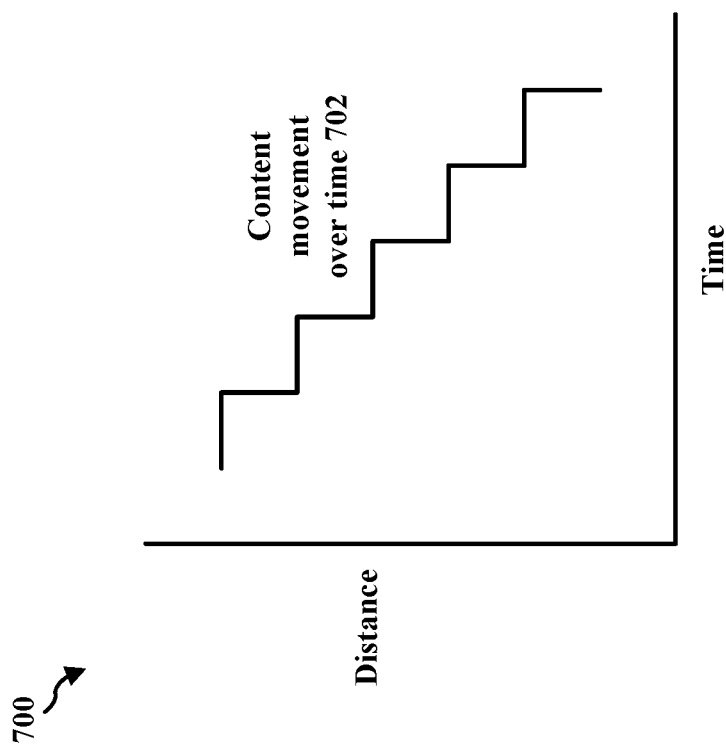
FIG. 7A is a graph illustrating content movement over time in accordance with one or more techniques of this disclosure.
Figure 7B:
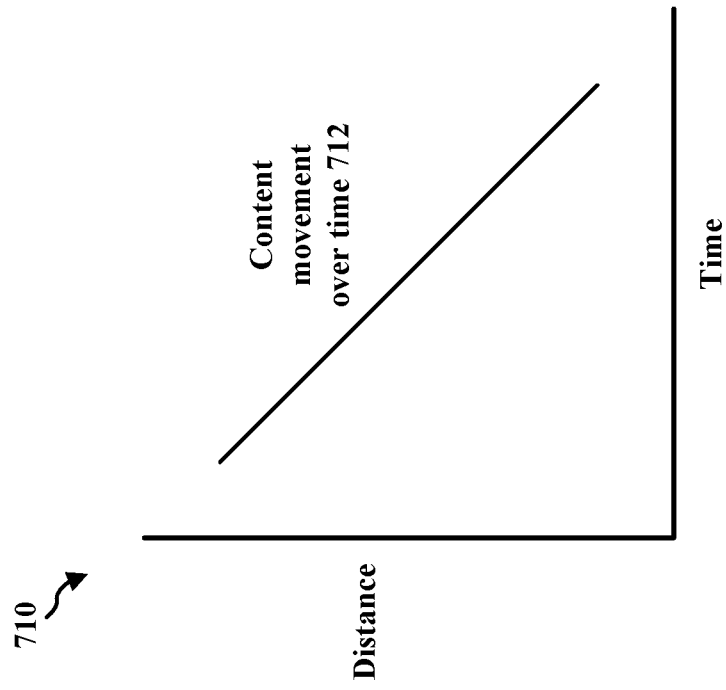
FIG. 7B is a graph illustrating content movement over time in accordance with one or more techniques of this disclosure.

Aspects of the present disclosure may include a number of benefits or advantages. For instance, aspects of the present disclosure may allow for frame content to be shifted smoothly. FIGS. 7A and 7B are diagrams 700 and 710, respectively, of shifting frame content with respect to a grid. For instance, FIGS. 7A and 7B depict content movement over time 702 and 712, respectively. FIG. 7A illustrates frame content that is shifted without using the aforementioned shifting techniques. For example, the content movement 702 in FIG. 7A is step-like and clunky. FIG. 7B shows frame content that is shifted when utilizing the aforementioned shifting techniques of aspects of the present disclosure. For example, the content movement 712 in FIG. 7B is smooth and gradual. As shown in FIGS. 7A and 7B, the aforementioned shifting techniques of aspects of the present disclosure may shift frame content more smoothly. Accordingly, a user may observe a higher quality of content shifting with the shifting techniques in aspects of the present disclosure.

Figure 8:
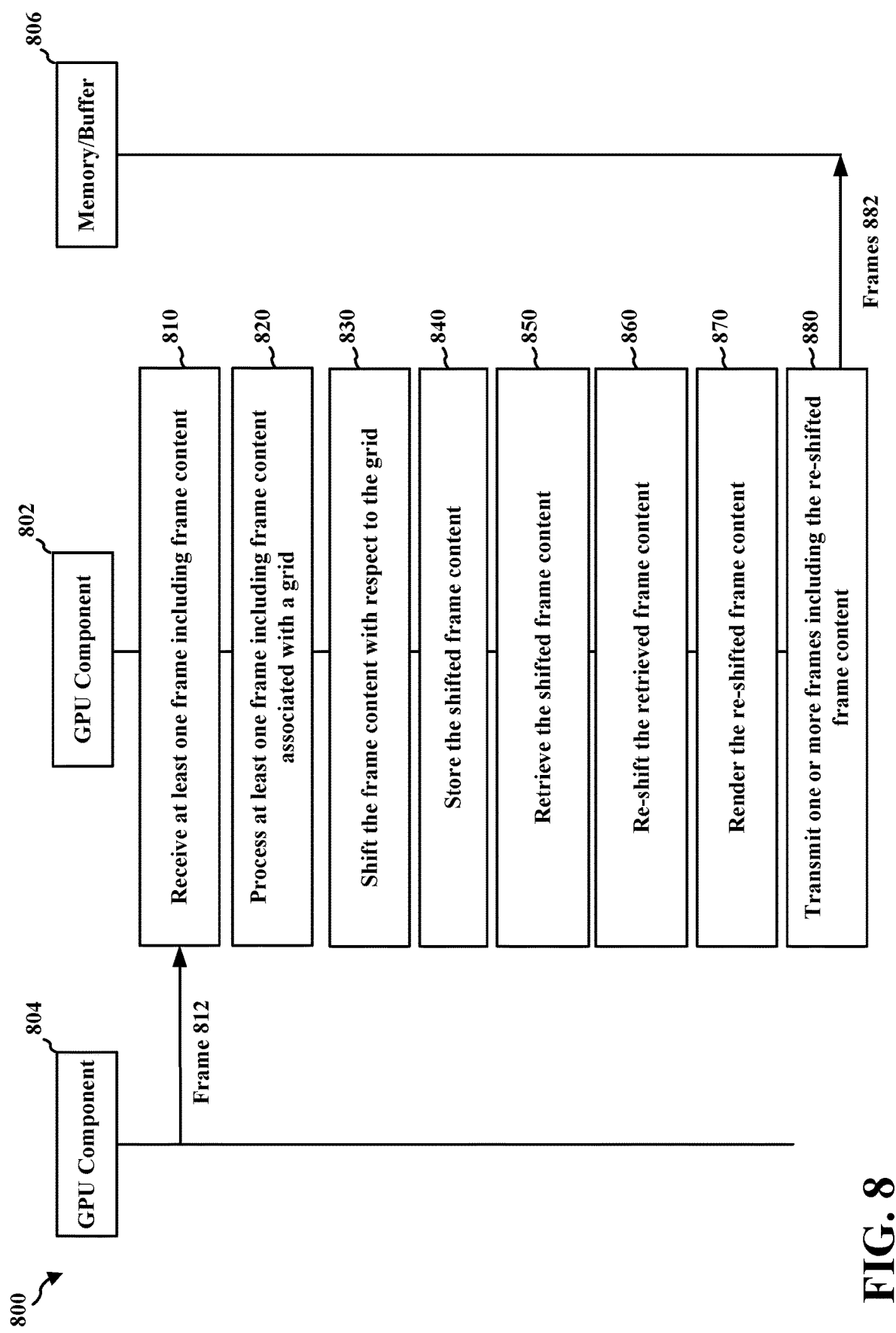
FIG. 8 is a communication flow diagram illustrating example communications between a GPU component, a GPU component, and a memory/buffer in accordance with one or more techniques of this disclosure.

FIG. 8 is a communication flow diagram 800 of graphics processing in accordance with one or more techniques of this disclosure. As shown in FIG. 8, diagram 800 includes example communications between GPU component 802, GPU component 804, and memory or buffer 806, in accordance with one or more techniques of this disclosure.

At 810, GPU component 802 may receive at least one frame including frame content, e.g., frame 812, where the at least one frame is processed after being received.

At 820, GPU component 802 may process at least one frame, e.g., frame 812, including frame content associated with a grid including a plurality of grid sections, each of a plurality of portions of the frame content being aligned with at least a portion of at least one of the plurality of grid sections. The grid may be a tile grid and the plurality of grid sections may be a plurality of tiles, such that each of the plurality of portions of the frame content is aligned with at least a portion of at least one of the plurality of tiles.

At 830, GPU component 802 may shift the frame content with respect to the grid, such that at least one portion of the plurality of portions of the frame content is aligned with at least a portion of at least one distinct grid section of the plurality of grid sections.

In some aspects, the shifted frame content may be associated with at least one of a shifting distance or a shifting area. The shifting distance or the shifting area of the shifted frame content may be bounded by an offset area in the grid. Also, at least some of the shifted frame content may correspond to an area less than an area of a grid section. A granularity of the shifted frame content may be less than a granularity of the area of a grid section. Further, each of the plurality of portions of the frame content may be shifted separately, or all of the plurality of portions of the frame content may be shifted together. A first portion of the frame content may correspond to a first portion of a display and a second portion of the frame content may correspond to a second portion of a display, such that the first portion of the frame content is shifted separately from the second portion of the frame content. Additionally, the frame content may be shifted with respect to the grid by a graphics processing unit (GPU).

At 840, GPU component 802 may store, upon shifting the frame content with respect to the grid, the shifted frame content including the at least one portion of the frame content that is aligned with at least a portion of the at least one distinct grid section. The shifted frame content may be stored in at least one of a memory, a graphics processing unit (GPU) memory, a system memory, or a buffer. Also, the shifted frame content may be shifted a different amount if stored in the system memory compared to being stored in the GPU memory. For instance, the shifted frame content may be shifted a lower amount if stored in the system memory compared to being stored in the GPU memory. Moreover, the frame content may be shifted at a same time that the frame content is stored, such that the frame content is shifted and stored simultaneously.

At 850, GPU component 802 may retrieve, upon storing the shifted frame content, the shifted frame content.

At 860, GPU component 802 may re-shift, upon retrieving the frame content, the retrieved frame content, such that the re-shifted frame content corresponds to the processed frame content. In some instances, the re-shifted frame content may be equivalent to the processed frame content.

At 870, GPU component 802 may render, upon re-shifting the frame content, the re-shifted frame content.

At 880, GPU component 802 may transmit, upon re-shifting the frame content, one or more frames including the re-shifted frame content, e.g., frames 882.

Figure 9:
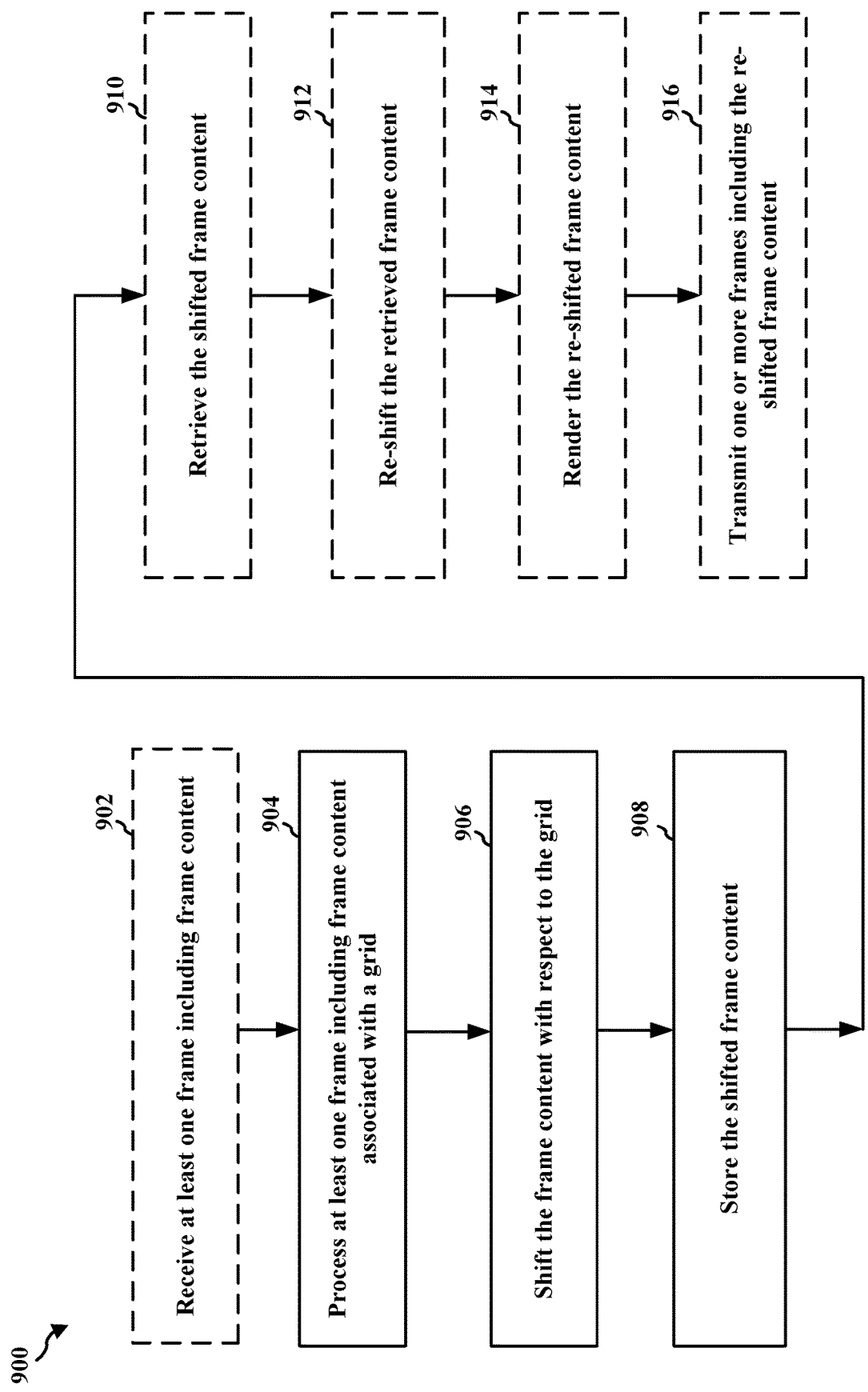
FIG. 9 is a flowchart of an example method of graphics processing in accordance with one or more techniques of this disclosure.

FIG. 9 is a flowchart 900 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-8.

At 902, the apparatus may receive at least one frame including frame content, where the at least one frame is processed after being received. For example, as described in 810 of FIG. 8, GPU component 802 may receive at least one frame including frame content, where the at least one frame is processed after being received. Further, processing unit 120 in FIG. 1 may perform step 902.

At 904, the apparatus may process at least one frame including frame content associated with a grid including a plurality of grid sections, each of a plurality of portions of the frame content being aligned with at least a portion of at least one of the plurality of grid sections. For example, as described in 820 of FIG. 8, GPU component 802 may process at least one frame including frame content associated with a grid including a plurality of grid sections, each of a plurality of portions of the frame content being aligned with at least a portion of at least one of the plurality of grid sections. Further, processing unit 120 in FIG. 1 may perform step 904. The grid may be a tile grid and the plurality of grid sections may be a plurality of tiles, such that each of the plurality of portions of the frame content is aligned with at least a portion of at least one of the plurality of tiles.

At 906, the apparatus may shift the frame content with respect to the grid, such that at least one portion of the plurality of portions of the frame content is aligned with at least a portion of at least one distinct grid section of the plurality of grid sections. For example, as described in 830 of FIG. 8, GPU component 802 may shift the frame content with respect to the grid, such that at least one portion of the plurality of portions of the frame content is aligned with at least a portion of at least one distinct grid section of the plurality of grid sections. Further, processing unit 120 in FIG. 1 may perform step 906.

In some aspects, the shifted frame content may be associated with at least one of a shifting distance or a shifting area. The shifting distance or the shifting area of the shifted frame content may be bounded by an offset area in the grid. Also, at least some of the shifted frame content may correspond to an area less than an area of a grid section. A granularity of the shifted frame content may be less than a granularity of the area of a grid section. Further, each of the plurality of portions of the frame content may be shifted separately, or all of the plurality of portions of the frame content may be shifted together. A first portion of the frame content may correspond to a first portion of a display and a second portion of the frame content may correspond to a second portion of a display, such that the first portion of the frame content is shifted separately from the second portion of the frame content. Additionally, the frame content may be shifted with respect to the grid by a graphics processing unit (GPU).

At 908, the apparatus may store, upon shifting the frame content with respect to the grid, the shifted frame content including the at least one portion of the frame content that is aligned with at least a portion of the at least one distinct grid section. For example, as described in 840 of FIG. 8, GPU component 802 may store, upon shifting the frame content with respect to the grid, the shifted frame content including the at least one portion of the frame content that is aligned with at least a portion of the at least one distinct grid section. Further, processing unit 120 in FIG. 1 may perform step 908. The shifted frame content may be stored in at least one of a memory, a graphics processing unit (GPU) memory, a system memory, or a buffer. Also, the shifted frame content may be shifted a different amount if stored in the system memory compared to being stored in the GPU memory. For instance, the shifted frame content may be shifted a lower amount if stored in the system memory compared to being stored in the GPU memory. Moreover, the frame content may be shifted at a same time that the frame content is stored, such that the frame content is shifted and stored simultaneously.

At 910, the apparatus may retrieve, upon storing the shifted frame content, the shifted frame content. For example, as described in 850 of FIG. 8, GPU component 802 may retrieve, upon storing the shifted frame content, the shifted frame content. Further, processing unit 120 in FIG. 1 may perform step 910.

At 912, the apparatus may re-shift, upon retrieving the frame content, the retrieved frame content, such that the re-shifted frame content corresponds to the processed frame content. For example, as described in 860 of FIG. 8, GPU component 802 may re-shift, upon retrieving the frame content, the retrieved frame content, such that the re-shifted frame content corresponds to the processed frame content. Further, processing unit 120 in FIG. 1 may perform step 912. In some instances, the re-shifted frame content may be equivalent to the processed frame content.

At 914, the apparatus may render, upon re-shifting the frame content, the re-shifted frame content. For example, as described in 870 of FIG. 8, GPU component 802 may render, upon re-shifting the frame content, the re-shifted frame content. Further, processing unit 120 in FIG. 1 may perform step 914.

At 916, the apparatus may transmit, upon re-shifting the frame content, one or more frames including the re-shifted frame content. For example, as described in 880 of FIG. 8, GPU component 802 may transmit, upon re-shifting the frame content, one or more frames including the re-shifted frame content. Further, processing unit 120 in FIG. 1 may perform step 916.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for processing at least one frame including frame content associated with a grid including a plurality of grid sections, each of a plurality of portions of the frame content being aligned with at least a portion of at least one of the plurality of grid sections; means for shifting the frame content with respect to the grid, such that at least one portion of the plurality of portions of the frame content is aligned with at least a portion of at least one distinct grid section of the plurality of grid sections; means for storing, upon shifting the frame content with respect to the grid, the shifted frame content including the at least one portion of the frame content that is aligned with at least a portion of the at least one distinct grid section; means for retrieving, upon storing the shifted frame content, the shifted frame content; means for re-shifting, upon retrieving the frame content, the retrieved frame content, such that the re-shifted frame content corresponds to the processed frame content; means for rendering, upon re-shifting the frame content, the re-shifted frame content; means for transmitting, upon re-shifting the frame content, the re-shifted frame content; and means for receiving the at least one frame including frame content, where the at least one frame is processed after being received.

The subject matter described herein can be implemented to realize one or more benefits or advantages. For instance, the described graphics processing techniques can be used by a GPU, a graphics processor, or some other processor that can perform graphics processing to implement the foveated rendering content shifting techniques described herein. This can also be accomplished at a low cost compared to other graphics processing techniques. Moreover, the graphics processing techniques herein can improve or speed up data processing or execution. Further, the graphics processing techniques herein can improve resource or data utilisation and/or resource efficiency. Additionally, aspects of the present disclosure can utilize foveated rendering content shifting in order to improve memory bandwidth efficiency and/or increase the processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing. The method includes processing at least one frame including frame content associated with a grid including a plurality of grid sections, each of a plurality of portions of the frame content being aligned with at least a portion of at least one of the plurality of grid sections; shifting the frame content with respect to the grid, such that at least one portion of the plurality of portions of the frame content is aligned with at least a portion of at least one distinct grid section of the plurality of grid sections; and storing, upon shifting the frame content with respect to the grid, the shifted frame content including the at least one portion of the frame content that is aligned with at least a portion of the at least one distinct grid section.

Aspect 2 is the method of aspect 1, where the shifted frame content is associated with at least one of a shifting distance or a shifting area.

Aspect 3 is the method of any of aspects 1 and 2, where the shifting distance or the shifting area of the shifted frame content is bounded by an offset area in the grid.

Aspect 4 is the method of any of aspects 1 to 3, where at least some of the shifted frame content corresponds to an area less than an area of a grid section.

Aspect 5 is the method of any of aspects 1 to 4, where a granularity of the shifted frame content is less than a granularity of the area of a grid section.

Aspect 6 is the method of any of aspects 1 to 5, further including retrieving, upon storing the shifted frame content, the shifted frame content.

Aspect 7 is the method of any of aspects 1 to 6, further including re-shifting, upon retrieving the frame content, the retrieved frame content, such that the re-shifted frame content corresponds to the processed frame content.

Aspect 8 is the method of any of aspects 1 to 7, where the re-shifted frame content is equivalent to the processed frame content.

Aspect 9 is the method of any of aspects 1 to 8, further including rendering, upon re-shifting the frame content, the re-shifted frame content.

Aspect 10 is the method of any of aspects 1 to 9, further including transmitting, upon re-shifting the frame content, one or more frames including the re-shifted frame content.

Aspect 11 is the method of any of aspects 1 to 10, where the shifted frame content is stored in at least one of a memory, a graphics processing unit (GPU) memory, a system memory, or a buffer.

Aspect 12 is the method of any of aspects 1 to 11, where the shifted frame content is shifted a different amount if stored in the system memory compared to being stored in the GPU memory.

Aspect 13 is the method of any of aspects 1 to 12, where the shifted frame content is shifted a lower amount if stored in the system memory compared to being stored in the GPU memory.

Aspect 14 is the method of any of aspects 1 to 13, where the frame content is shifted at a same time that the frame content is stored, such that the frame content is shifted and stored simultaneously.

Aspect 15 is the method of any of aspects 1 to 14, where the grid is a tile grid and the plurality of grid sections is a plurality of tiles, such that each of the plurality of portions of the frame content is aligned with at least a portion of at least one of the plurality of tiles.

Aspect 16 is the method of any of aspects 1 to 15, further including receiving the at least one frame including frame content, where the at least one frame is processed after being received.

Aspect 17 is the method of any of aspects 1 to 16, where each of the plurality of portions of the frame content is shifted separately, or all of the plurality of portions of the frame content are shifted together.

Aspect 18 is the method of any of aspects 1 to 17, where a first portion of the frame content corresponds to a first portion of a display and a second portion of the frame content corresponds to a second portion of a display, such that the first portion of the frame content is shifted separately from the second portion of the frame content.

Aspect 19 is the method of any of aspects 1 to 18, where the frame content is shifted with respect to the grid by a graphics processing unit (GPU).

Aspect 20 is an apparatus for graphics processing including at least one processor coupled to a memory and configured to implement a method as in any of aspects 1 to 19.

Aspect 21 is an apparatus for graphics processing including means for implementing a method as in any of aspects 1 to 19.

Aspect 22 is a computer-readable medium storing computer executable code, the code when executed by at least one processor causes the at least one processor to implement a method as in any of aspects 1 to 19.

What is claimed is:

1. An apparatus for graphics processing, comprising:
a memory; and
at least one processor coupled to the memory and configured to:
process at least one frame including frame content associated with a grid including a plurality of grid sections, each of a plurality of portions of the frame content being aligned with at least a portion of at least one of the plurality of grid sections;
shift the frame content with respect to the grid, such that at least one portion of the plurality of portions of the frame content is aligned with at least a portion of at least one distinct grid section of the plurality of grid sections, wherein the shifted frame content is associated with a shifting area, and wherein the shifting area of the shifted frame content is bounded by an offset area in the grid;
store, based on the at least one processor being configured to shift the frame content with respect to the grid, the shifted frame content including the at least one portion of the frame content that is aligned with at least the portion of the at least one distinct grid section;
retrieve, based on the at least one processor being configured to store the shifted frame content, the shifted frame content; and
re-shift, based on the at least one processor being configured to retrieve the frame content, the retrieved frame content, such that the re-shifted frame content corresponds to the processed frame content,
wherein at least some of the shifted frame content corresponds to an area less than an area of a grid section in the plurality of grid sections.

2. The apparatus of claim 1, wherein a granularity of the shifted frame content is less than a granularity of the area of the grid section in the plurality of grid sections.

3. The apparatus of claim 1, wherein the re-shifted frame content is equivalent to the processed frame content.

4. The apparatus of claim 1, wherein the at least one processor is further configured to:
render, based on the at least one processor being configured to re-shift the frame content, the re-shifted frame content.

5. The apparatus of claim 1, wherein the at least one processor is further configured to:

transmit, based on the at least one processor being configured to re-shift the frame content, one or more frames including the re-shifted frame content.

6. The apparatus of claim 1, wherein the at least one processor is configured to store the shifted frame content in at least one of a first memory, a graphics processing unit (GPU) memory, a system memory, or a buffer.

7. The apparatus of claim 6, wherein the at least one processor is configured to shift the shifted frame content a different amount if the at least one processor is configured to store the shifted frame content in the system memory compared to the at least one processor being configured to store the shifted frame content in the GPU memory.

8. The apparatus of claim 7, wherein the at least one processor is configured to shift the shifted frame content a lower amount if the at least one processor is configured to store the shifted frame content in the system memory compared to the at least one processor being configured to store the shifted frame content in the GPU memory.

9. The apparatus of claim 1, wherein the at least one processor is configured to shift the frame content at a same time that the at least one processor is configured to store the frame content, such that the at least one processor is configured to shift and store the frame content simultaneously.

10. The apparatus of claim 1, wherein the grid is a tile grid and the plurality of grid sections is a plurality of tiles, such that each of the plurality of portions of the frame content is aligned with at least a portion of at least one of the plurality of tiles.

11. The apparatus of claim 1, wherein the at least one processor is further configured to:
receive the at least one frame including the frame content, wherein the at least one processor is configured to process the at least one frame after the at least one processor is configured to receive the at least one frame.

12. The apparatus of claim 1, wherein the at least one processor is configured to shift each of the plurality of portions of the frame content separately.

13. The apparatus of claim 1, wherein a first portion of the frame content corresponds to a first portion of a display and a second portion of the frame content corresponds to a second portion of the display, such that the at least one processor is configured to shift the first portion of the frame content separately from the second portion of the frame content.

14. The apparatus of claim 1, wherein the at least one processor is configured to shift all of the plurality of portions of the frame content together, and the at least one processor is configured to shift the frame content with respect to the grid at a graphics processing unit (GPU).

15. A method of graphics processing, comprising:
processing at least one frame including frame content associated with a grid including a plurality of grid sections, each of a plurality of portions of the frame content being aligned with at least a portion of at least one of the plurality of grid sections;
shifting the frame content with respect to the grid, such that at least one portion of the plurality of portions of the frame content is aligned with at least a portion of at least one distinct grid section of the plurality of grid sections, wherein the shifted frame content is associated with a shifting area, and wherein the shifting area of the shifted frame content is bounded by an offset area in the grid;
storing, based on shifting the frame content with respect to the grid, the shifted frame content including the at least one portion of the frame content that is aligned with at least the portion of the at least one distinct grid section;
retrieving, based on storing the shifted frame content, the shifted frame content; and
re-shifting, based on retrieving the frame content, the retrieved frame content, such that the re-shifted frame content corresponds to the processed frame content, wherein the re-shifted frame content is equivalent to the processed frame content,
wherein at least some of the shifted frame content corresponds to an area less than an area of a grid section in the plurality of grid sections.

16. The method of claim 15, wherein a granularity of the shifted frame content is less than a granularity of the area of the grid section in the plurality of grid sections.

17. The method of claim 15, further comprising:
rendering, based on re-shifting the frame content, the re-shifted frame content; and
transmitting, based on re-shifting the frame content, one or more frames including the re-shifted frame content.

18. The method of claim 15, wherein the shifted frame content is stored in at least one of a memory, a graphics processing unit (GPU) memory, a system memory, or a buffer, wherein the shifted frame content is shifted a different amount if stored in the system memory compared to being stored in the GPU memory.

19. The method of claim 15, wherein the frame content is shifted at a same time that the frame content is stored, such that the frame content is shifted and stored simultaneously.

20. The method of claim 15, wherein the grid is a tile grid and the plurality of grid sections is a plurality of tiles, such that each of the plurality of portions of the frame content is aligned with at least a portion of at least one of the plurality of tiles.

21. The method of claim 15, further comprising:
receiving the at least one frame including the frame content, wherein the at least one frame is processed after being received.

22. An apparatus for graphics processing, comprising:
means for processing at least one frame including frame content associated with a grid including a plurality of grid sections, each of a plurality of portions of the frame content being aligned with at least a portion of at least one of the plurality of grid sections;
means for shifting the frame content with respect to the grid, such that at least one portion of the plurality of portions of the frame content is aligned with at least a portion of at least one distinct grid section of the plurality of grid sections, wherein the shifted frame content is associated with a shifting area, and wherein the shifting area of the shifted frame content is bounded by an offset area in the grid;
means for storing, based on shifting the frame content with respect to the grid, the shifted frame content including the at least one portion of the frame content that is aligned with at least the portion of the at least one distinct grid section;
means for retrieving, based on storing the shifted frame content, the shifted frame content; and
means for re-shifting, based on retrieving the frame content, the retrieved frame content, such that the re-shifted frame content corresponds to the processed frame content, wherein the re-shifted frame content is equivalent to the processed frame content, wherein at least some of the shifted frame content corresponds to an area less than an area of a grid section in the plurality of grid sections.

23. A non-transitory computer-readable medium storing computer executable code for graphics processing, the code when executed by a processor causes the processor to:

process at least one frame including frame content associated with a grid including a plurality of grid sections, each of a plurality of portions of the frame content being aligned with at least a portion of at least one of the plurality of grid sections;

shift the frame content with respect to the grid, such that at least one portion of the plurality of portions of the frame content is aligned with at least a portion of at least one distinct grid section of the plurality of grid sections, wherein the shifted frame content is associated with a shifting area, and wherein the shifting area of the shifted frame content is bounded by an offset area in the grid;

store, based on shifting the frame content with respect to the grid, the shifted frame content including the at least one portion of the frame content that is aligned with at least the portion of the at least one distinct grid section;

retrieve, based on storing the shifted frame content, the shifted frame content; and re-shift, based on retrieving the frame content, the retrieved frame content, such that the re-shifted frame content corresponds to the processed frame content, wherein the re-shifted frame content is equivalent to the processed frame content, wherein at least some of the shifted frame content corresponds to an area less than an area of a grid section in the plurality of grid sections.

* * * * *